April 12, 1932. G. M. SPROWLS 1,853,324
VULCANIZING APPARATUS
Filed April 4, 1928
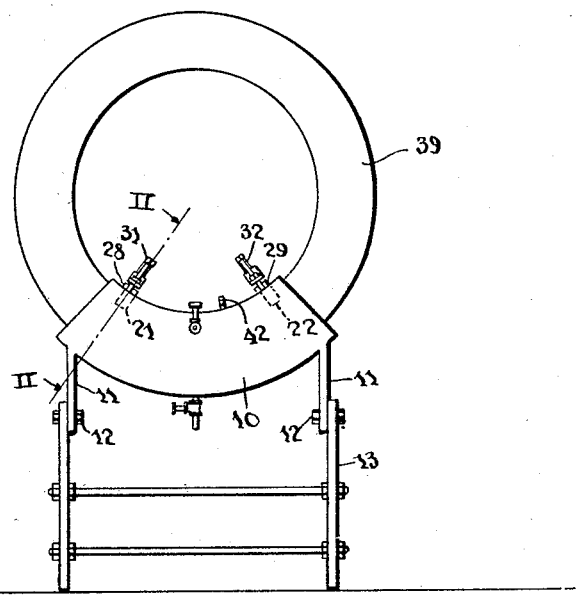
Inventor
George M. Sprowls.
Attorney Patented Apr. 12, 1932

1,853,324

UNITED STATES PATENT OFFICE

GEORGE M. SPROWLS, OF AKRON, OHIO, ASSIGNOR TO THE GOODYEAR TIRE & RUBBER COMPANY, OF AKRON, OHIO, A CORPORATION OF OHIO

VULCANIZING APPARATUS

Application filed April 4, 1928. Serial No. 267,230.

This invention relates generally to apparatus for vulcanizing products composed of rubber and it has particular relation to an apparatus of the above designated character for vulcanizing the repaired portions of pneumatic tire casings, and the like.

One object of the invention is to provide a relatively economical vulcanizing apparatus having a greater production capacity than that of the apparatus heretofore generally employed.

Another object of the invention is to provide a vulcanizing apparatus for repairing pneumatic tire casings, in which a heating element is employed continuously for curing tires without the necessity of its being rendered inoperative during the period of time in which the vulcanizing heat is dissipated by the casings.

Prior to the invention, known apparatus, employed for vulcanizing the repaired portions of pneumatic tire casings embodied a chambered unit to which steam was supplied for vulcanizing the rubber employed in repairing the casing. At the end of a predetermined period of time the steam was shut off and the apparatus was permitted to cool until the casing safely could be removed therefrom. During this period of time the apparatus was not only incapable of being employed for curing the repaired portions of other pneumatic tire casings, but a great amount of heat was entirely wasted, owing to the necessity for cooling the entire apparatus.

This embodiment of the invention comprises a heating unit, to which steam is applied continuously, having a plurality of shells or molding elements which are disposed successively in heat-conducting relationship to the heating unit. A repaired portion of a pneumatic tire casing is positioned within one of the shells and secured rigidly therein by suitable clamping devices. The shell and casing are disposed within the heating unit and the heat supplied to the latter is conducted to the casing through the shell. When the repaired portion of the tire casing has had a sufficient qantity of heat applied thereto, the shell and the casing are removed from the heating unit and another shell and casing are inserted therein. The first-mentioned casing is permitted to cool under pressure within its shell for a predetermined period of time, after which it is removed therefrom and the shell again employed as hereinbefore described.

For a better understanding of the invention, reference may now be had to the accompanying drawings, forming a part of the specification, in which:

Fig. 1 is a side elevational view of an apparatus embodying one form of the invention, having a pneumatic tire casing inserted therein; and Fig. 2 is a cross-sectional view taken substantially on line II—II of Fig. 1.

In practicing the invention, an arcuately formed heating unit 10 having a substantially U-shape cross-sectional configuration, is supported by bars 11 that are secured by bolts 12, to an upper portion of a fabricated supporting frame 13. The interior of the heating unit 10 is chambered, as indicated at 14, for receiving steam or other suitable heating fluid through conduits 16 and 17, which are connected at the upper portions of the chamber. A conduit 18 communicating with a lower portion of the chamber 14 provides means for exhausting the heating fluid from the chamber. An arcuate shell 19 registers in heat-conducting relationship with a depression within the central portion of the heating unit 10. Spaced pairs of lugs 21 and 22, formed externally with respect to the shell 19, adjacent the opposite extremities thereof, are adapted to be received by complementary recesses formed in upper portions of the unit 10. Arcuate sections 23 and 24, constituting a head 26, are removably secured together by dowel pins 27 screw-threaded into an edge of the section 24 and slidably engaging openings disposed oppositely thereto in the corresponding edge of the section 23. The head 26 is secured within an upper portion of the shell 19 by engagement with a spaced pair of circular blocks 28 and 29 that are journaled on the lower ends of a pair of set screws 31 and 32. The set screws 31 and 32 are screw-threaded into openings formed within lugs 33 disposed intermediate the ends of bars 34.

Machine screws 36, projecting through openings formed adjacent the opposite ends of the bars 34, are screw-threaded in openings formed in the upper surfaces of the pairs of lugs 21 and 22. Stud bolts 37, disposed vertically in the upper edges of the heating unit 10, project through openings formed in the ends of the bars 34, which are located beyond the openings for receiving the screws 36, and are adapted to receive nuts 38 upon the ends thereof, above the bars.

In the operation of the apparatus, a portion of a pneumatic tire casing 39, which previously has been repaired by the employment of uncured rubber, is inserted within the shell 19. An airbag 41, having a valve stem 42, is positioned within the portion of the casing 39 which is arranged within the interior of the shell 19. The sections 23 and 24 of the head 26 then are inserted in the upper portion of the shell 19 above the bead portions of the casing 39, and the bars 34 are secured in position by the manipulation of the machine screws 36. The head 26 is then forced downwardly by the manipulation of the screws 31 and 32 until the casing is secured rigidly within the shell 19. An air hose (not shown), thereafter, is associated operatively with the valve stem 42 of the airbag 41 and the latter is inflated to a predetermined pressure. When the casing 39 and the shell 19 are thus assembled, the unit is inserted within the heating unit 10 and the nuts 38 are tightened slightly in order to insure efficient heat conducting contact between the shell 19 and the heater 10. After a predetermined time has elapsed, during which heat from the steam within the steam chamber 14 cures the repaired portion of the casing 39, the latter and the shell 19 are removed from the heating unit 10 and another casing secured within a shell, as hereinbefore described, is inserted therein. The first mentioned casing 39 is permitted to remain within the shell 19 until its temperature has been reduced substantially and the vulcanization of the repaired portion of the casing is completed. The airbag 31 then is deflated and the head 26 and casing 39 are removed from the shell 19, which is thereafter employed in curing the repaired portion of other pneumatic tire casings, as hereinbefore described.

From the foregoing description, it is apparent that pneumatic tire casings may be repaired more economically by the employment of the apparatus embodying the invention than was possible when employing the apparatus heretofore known. Since the heating unit is employed continuously in supplying heat to the unvulcanized portions of pneumatic tire casings and is not intermittently cooled as in the apparatus heretofore employed, a very material saving of heat energy results. Owing to the fact that the tire casing and shell are removed from the heater while the heat embodied therein is dissipated, the time required for the curing operation is greatly decreased, since the shell is directly exposed to the atmosphere, whereas formerly, it was conducted at a very low rate through the heater.

Although I have illustrated but the preferred form which the invention may assume, and have described that form in detail, it will be apparent to those skilled in the art that the invention is not so limited but that various modifications may be made therein without departing from the spirit of the invention or from the scope of the appended claims.

What I claim is:

1. A vulcanizing apparatus comprising a molding shell, a heater associated conductively with a portion of the shell, means for compressing a portion of a pneumatic tire casing within the shell, and means for removably securing the last-mentioned means to the shell and the heater.

2. A vulcanizing apparatus comprising a molding shell, a heater associated conductively with a portion of the shell, a head means for securing the head to the shell, means for compressing a portion of a pneumatic tire casing within the shell, and means associated with the aforementioned means for securing the head and the shell to the heater.

3. A vulcanizing apparatus comprising a molding shell, a heater associated conductively with a portion of the shell, a head, means for removably securing the head to the shell, means for compressing a portion of a pneumatic tire casing within the shell, and means associated with the aforementioned means for removably securing the head and the shell to the heater rigidly.

In witness whereof, I have hereunto signed my name.

Signed at Akron, in the county of Summit and State of Ohio, U. S. A., this 3rd day of April, 1928.

GEORGE M. SPROWLS.